United States Patent
Chadbourne et al.

(10) Patent No.: US 12,319,625 B1
(45) Date of Patent: Jun. 3, 2025

(54) ULTRASHORT PULSE LASER SURFACE TREATMENT OF CERAMICS

(71) Applicant: Honeywell Federal Manufacturing & Technologies, LLC, Kansas City, MO (US)

(72) Inventors: Connor Lane Chadbourne, Kansas City, MO (US); Parker T. Freudenberger, Overland Park, KS (US); Luke A. Hanner, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

(21) Appl. No.: 18/667,149

(22) Filed: May 17, 2024

Related U.S. Application Data

(60) Provisional application No. 63/503,041, filed on May 18, 2023.

(51) Int. Cl.
 C04B 37/00 (2006.01)
 C04B 41/00 (2006.01)

(52) U.S. Cl.
 CPC ........ *C04B 37/001* (2013.01); *C04B 41/0036* (2013.01); *C04B 41/0072* (2013.01); *C04B 41/009* (2013.01); *C04B 2237/52* (2013.01)

(58) Field of Classification Search
 CPC .............. C04B 37/001; C04B 41/0036; C04B 41/0072; C04B 41/009; C04B 2237/52
 See application file for complete search history.

(56) References Cited

U.S. PATENT DOCUMENTS

| | | | |
|---|---|---|---|
| 2002/0065553 A1* | 5/2002 | Weber | A61F 2/91 623/1.46 |
| 2017/0260100 A1* | 9/2017 | Kakehata | A61F 2/30 |

* cited by examiner

*Primary Examiner* — Monica A Huson
(74) *Attorney, Agent, or Firm* — Erise IP, P.A.

(57) ABSTRACT

Systems and methods for forming laser induced periodic surface structures (LIPSS) on a ceramic substrate via an ultrashort pulse variable wavelength laser are disclosed. The LIPSS may comprise channels, protrusions, or other microstructures. LIPSS may be selectively formed on the ceramic substrate to allow for the adjustment of one or more properties of the ceramic material. Pre-processing and post-processing may be utilized to further adjust or change the properties and microstructure of the ceramic material. Post-processing, such as a heat treatment, may be utilized to join two or more ceramic substrates comprising LIPSS to adjust or change properties of a joined part comprising the two or more ceramic substrates.

19 Claims, 9 Drawing Sheets

ULTRASHORT PULSE LASER SURFACE TREATMENT OF CERAMICS

REFERENCE TO RELATED APPLICATIONS

This patent application claims priority benefit, with regard to all common subject matter, of U.S. Provisional Patent Application No. 63/503,041, filed May 18, 2023, and entitled "SURFACE TREATMENT OF CERAMICS FOR HEAT TRANSFER." The above-referenced application is hereby incorporated by reference in its entirety into the present application.

STATEMENT OF GOVERNMENTAL SUPPORT

This invention was made with government support under DE-NA-0002839 awarded by the United States Department of Energy/National Nuclear Security Administration. The government has certain rights in the invention.

BACKGROUND

1. Field

Embodiments of the present disclosure relate to the surface treatment of ceramics. More specifically, embodiments of the present disclosure relate to systems and methods for forming laser induced periodic surface structures (LIPSS) via ultrashort pulse laser-patterned surfaces for heat transfer, wettability, and other purposes.

2. Related Art

Surface treatment techniques are often employed to alter the surface structure of materials used in a variety of applications, including heat transfer, wicking, wettability, emissivity, among other applications. Various techniques are employed to etch, embed, or otherwise form surface structures on the surface of the material to increase the total area or to form channels or pathways.

Advancements in laser processing techniques are now used in the formation of laser induced periodic surface structures (LIPSS). LIPSS are surface structures that are formed through the ablation and redeposition of surface material to form mound like structures. In particular, advancements in femtosecond laser surface processing (FLSP) provides for granular control and consistency in forming LIPSS. While FLSP is a relatively recent technique, research has been performed in forming LIPSS in metal material such as aluminum, nickel, and copper. Such metal materials have very high thermal conductivity and are limited in use as insulators. Ceramics, which may be used in similar applications to metals, have characteristics that provide varying and different results from metals, even when used in the identical applications. For example, the operating temperatures between metals and ceramics differ significantly, with ceramics set apart from metals with higher operating temperatures. Further for example, at an electronic level, ceramics and metals differ significantly. Because of these intrinsic conductive, thermal, physical, electronic, and compositional differences between metals and ceramics, merely using techniques and processes suitable for metals will not transfer to ceramics.

SUMMARY

Embodiments of the present disclosure solve the above-mentioned problems by providing systems and methods for producing laser induced periodic surface structures (LIPSS) on a non-metallic material, such as a ceramic material, via an ultrashort pulse (e.g., femtosecond to picosecond pulse) variable wavelength laser system. The systems and methods described herein allow for the adjusting or changing of ceramic properties that are not possible with known techniques of using FLSP with metals. The LIPSS may comprise any of protrusions, mounds, channels, pyramids, or other micro or nano structures (individually or collectively, "surface structures" or "LIPSS") formed on a ceramic substrate. The surface structures formed on ceramic materials may facilitate the adjusting of any of the porosity, specific surface area, catalytic behavior, wettability, diffusivity, emissivity, wear resistance, mechanical strength, or corrosion resistance of the ceramic material. The adjusting of ceramic properties may be further facilitated by a pre-treatment and/or a post-treatment process. At least one of the microstructures, the pre-treatment, or the post-treatment may adjust a chemical and/or a physical property to a predetermined value. Additionally, producing LIPSS on ceramic materials may achieve a LIPSS size (e.g., 1 millimeter to 2 millimeters) that is not possible with known techniques of producing LIPSS on metal materials.

Clause 1. A method for producing laser induced periodic surface structures on a substrate material, the method comprising: performing a pre-treatment of a surface of the substrate material, wherein the substrate material is a non-metallic material; and forming a plurality of surface structures on the surface of the substrate material, wherein the forming is performed by an ultrashort pulse laser system, wherein the plurality of surface structures comprises periodically consistent micro or nano structures formed in response to the ultrashort pulse laser system, wherein the forming the plurality of surface structures adjusts at least one of a chemical property or a physical property of the substrate material to a predetermined value.

Clause 2. The method of clause 1, further comprising performing a post-treatment of the surface of the substrate material.

Clause 3. The method of clause 2, wherein the post-treatment consists of at least one of a heat treatment, an ultrasonic bath in distilled water, or a surface coating.

Clause 4. The method of clause 2, wherein at least one of the pre-treatment or the post-treatment facilitates the adjusting of the at least one of the chemical property or the physical property of the substrate material to the predetermined value.

Clause 5. The method of clause 1, further comprising performing a heat treatment to one or more surface structures from the plurality of surface structures, wherein the one or more surface structures are heated to a temperature between 600° C. to 2,000° C.

Clause 6. The method of clause 5, wherein the performing the heat treatment includes sintering the one or more surface structures to control a porosity of the one or more surface structures.

Clause 7. The method of clause 1, wherein the substrate material is a ceramic material chosen from a group consisting of: silicon nitride, silicon carbide, alumina, aluminum nitride, zirconia, silica, Macor®, boron carbide, boron nitride, and graphite.

Clause 8. The method of clause 1, wherein the pre-treatment consists of at least one of a heat treatment, a chemical wash, or an etching process.

Clause 9. A method for producing laser induced periodic surface structures on a substrate material, the method comprising: forming a plurality of surface structures on the surface of the substrate material, wherein the substrate material is a non-metallic material, wherein the forming is performed by an ultrashort pulse laser system, wherein the plurality of surface structures comprises periodically consistent micro or nano structures formed in response to the ultrashort pulse laser system; and performing a post-treatment of the surface of the substrate material, wherein the forming the plurality of surface structures and the performing the post-treatment adjust at least one of a chemical property or a physical property of the substrate material to a predetermined value.

Clause 10. The method of clause 9, wherein the at least one of the chemical property or the physical property includes at least one of porosity, specific surface area, diffusivity, reactivity, mechanical strength, wear resistance, wettability, or emissivity, wherein the predetermined value is a predetermined value of at least one of an adjusted chemical property or an adjusted physical property.

Clause 11. The method of clause 9, wherein the post-treatment consists of at least one of a heat treatment, an ultrasonic bath in distilled water, or a surface coating.

Clause 12. The method of clause 9, wherein the substrate material is a ceramic material chosen from a group consisting of: silicon nitride, silicon carbide, alumina, aluminum nitride, zirconia, silica, Macor®, boron carbide, boron nitride, and graphite.

Clause 13. The method of clause 9, wherein the plurality of surface structures comprises a plurality of protrusions with an average height within a range of 10 micrometers to 2,000 micrometers and a plurality of channels with an average width within a range of 1 micrometer to 2,000 micrometers.

Clause 14. The method of clause 13, wherein the post-treatment consists of an ultrasonic bath in distilled water such that the average height of the plurality of protrusions is reduced by a range of 10% to 50% of the average height.

Clause 15. A method for joining a plurality of ceramic surfaces, the method comprising: forming a first plurality of surface structures on a surface of a first ceramic material; forming a second plurality of surface structures on a surface of a second ceramic material, wherein the plurality of ceramic surfaces comprises at least the first ceramic material and the second ceramic material, wherein the forming is performed by an ultrashort pulse laser system, wherein the first plurality of surface structures and the second plurality of surface structures comprise periodically consistent micro or nano structures formed in response to the ultrashort pulse laser system; positioning one or more surfaces structures of the first plurality of surface structures proximate one or more surface structures of the second plurality of surface structures; and heating the first ceramic material and the second ceramic material such that the one or more surfaces structures of the first plurality of surface structures join to the one or more surface structures of the second plurality of surface structures at one or more bonding areas.

Clause 16. The method of clause 15, further comprising: performing one or more pre-treatments on at least one of the first ceramic material and the second ceramic material.

Clause 17. The method of clause 15, wherein joining the first ceramic material to the second ceramic materials forms a joined part, wherein forming the first plurality of surface structures, forming the second plurality of surface structures, and joining the first ceramic material to the second ceramic material adjusts at least one of a chemical property or a physical property of the joined part to a predetermined value.

Clause 18. The method of clause 17, wherein the at least one of the chemical property or the physical property includes at least one of porosity, specific surface area, diffusivity, reactivity, mechanical strength, wear resistance, wettability, or emissivity, wherein the predetermined value is a predetermined value of at least one of an adjusted chemical property or an adjusted physical property.

Clause 19. The method of clause 18, wherein a joint of the first ceramic material and the second ceramic material comprises one or more porous channels.

Clause 20. The method of clause 15, wherein the first ceramic material and the second ceramic material are each chosen from a group consisting of: silicon nitride, silicon carbide, alumina, aluminum nitride, zirconia, silica, Macor®, boron carbide, boron nitride, and graphite.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 3A:
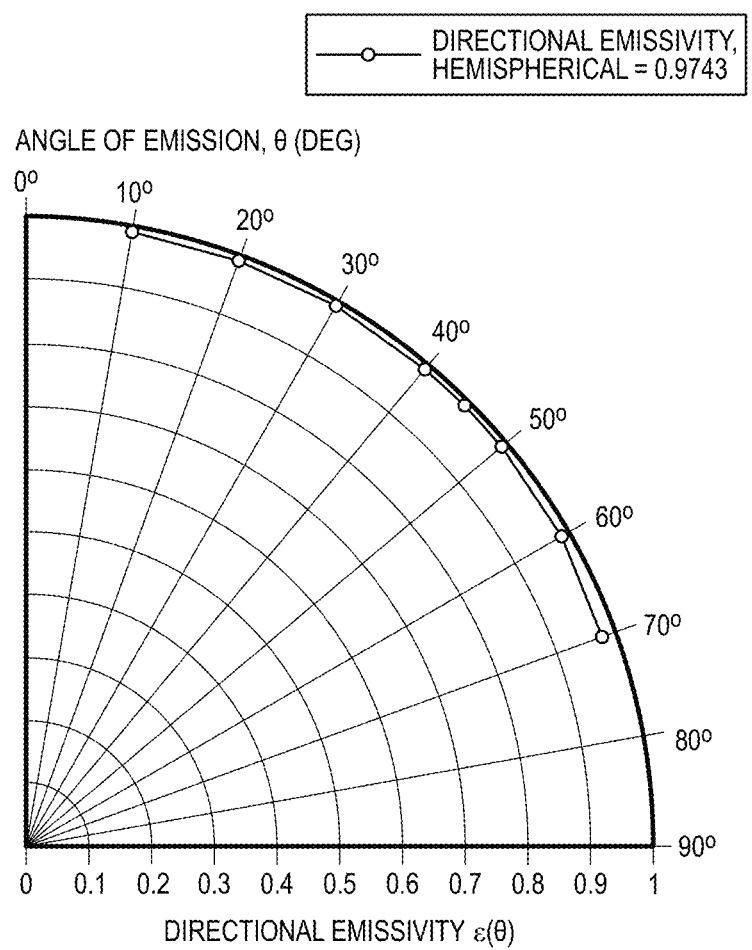
Figure 3B:
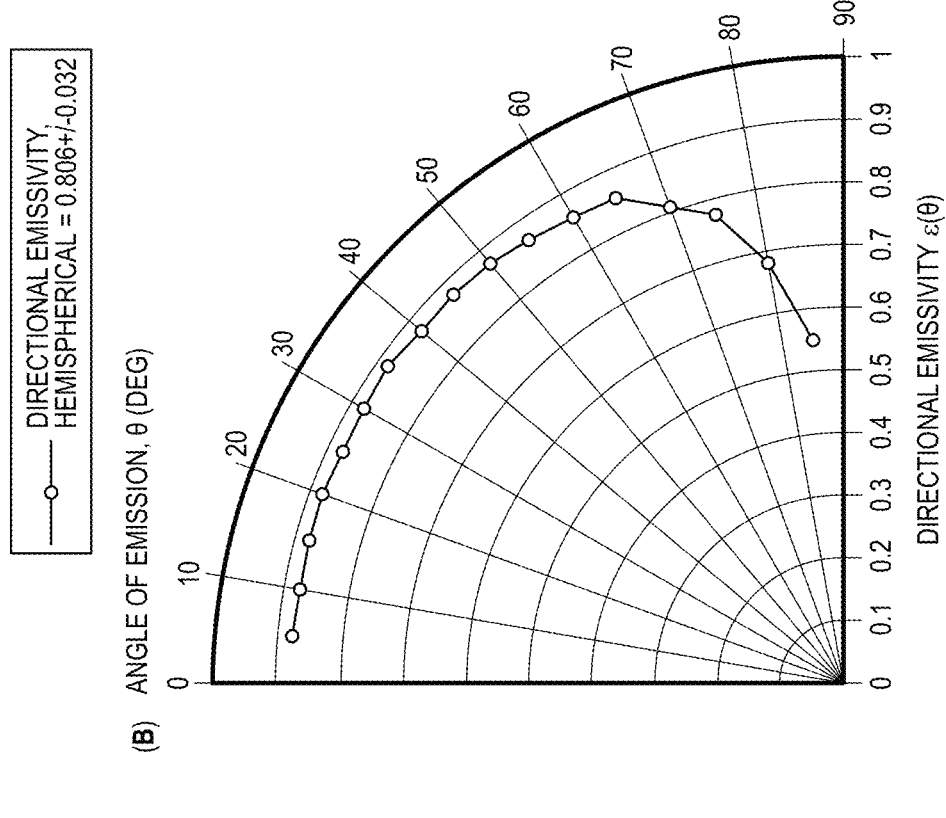
Figure 3B:
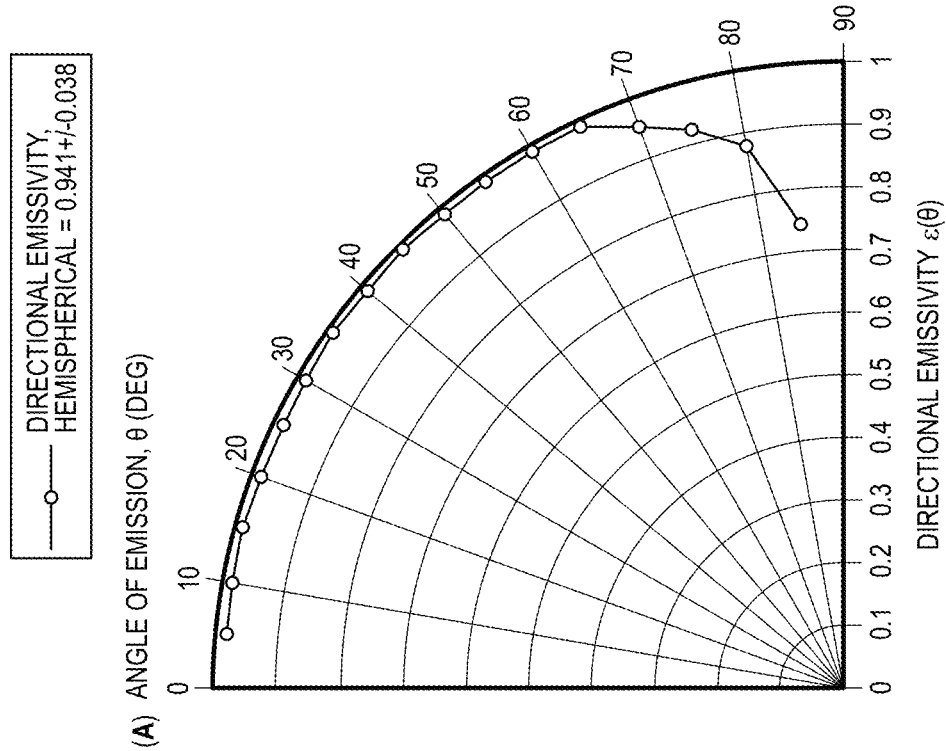
Figure 3C:
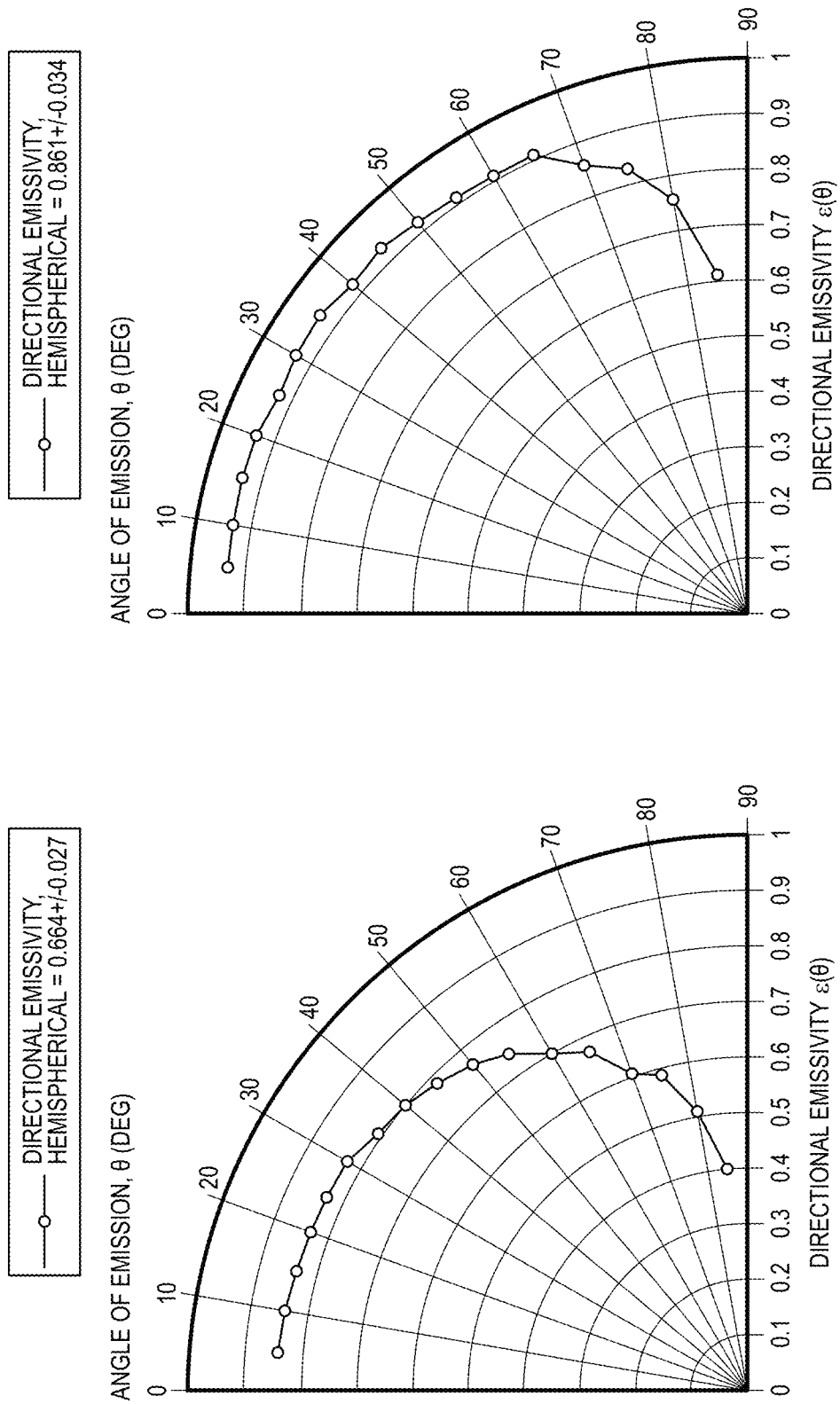
Figure 4:
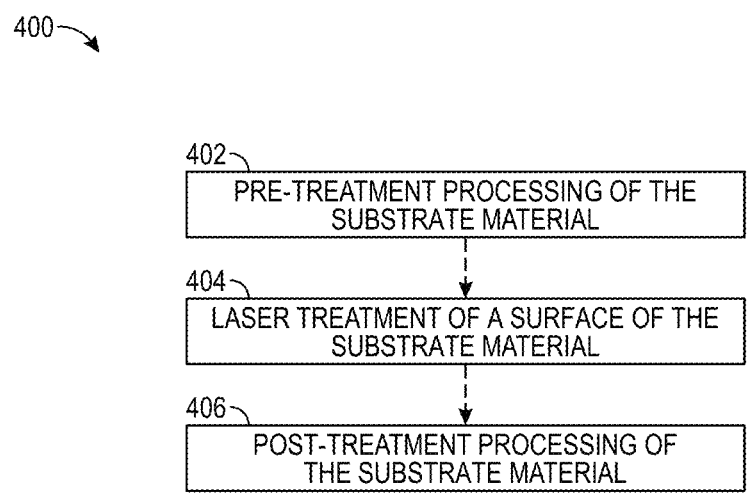
Figure 5A:
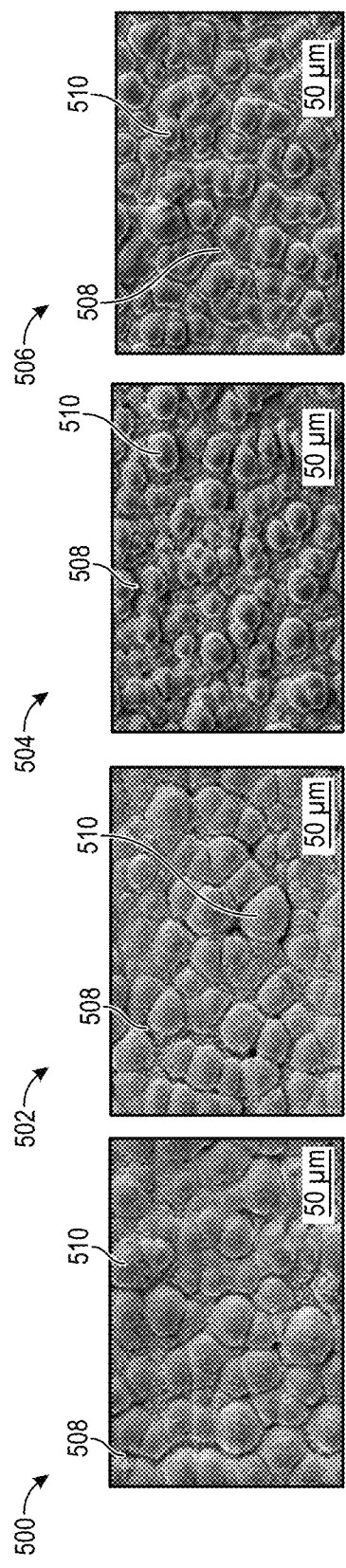
Figure 5B:
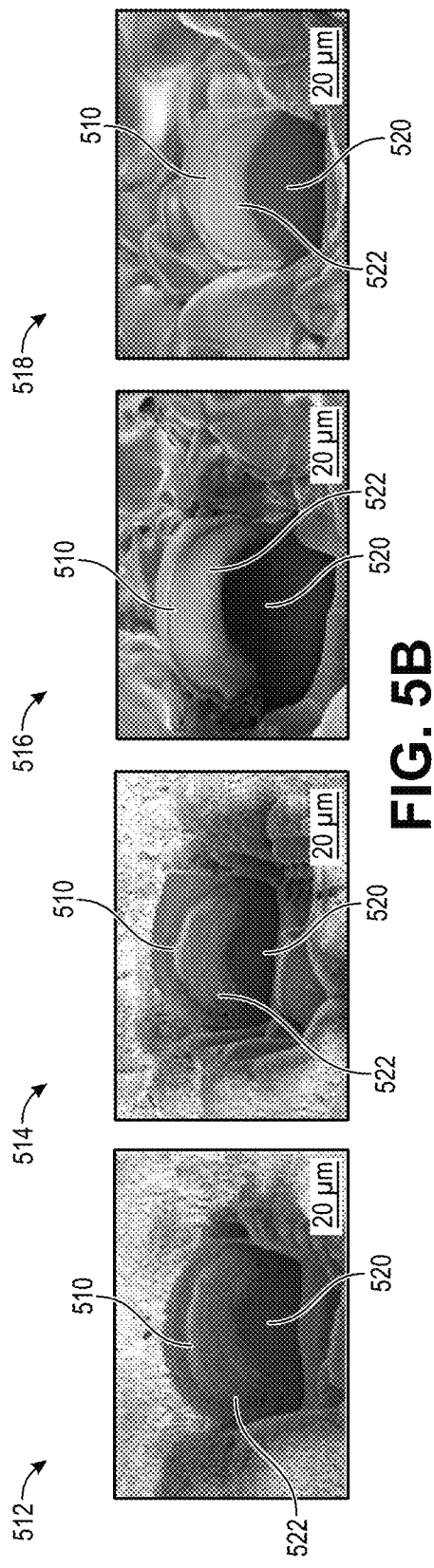
Figure 6A:
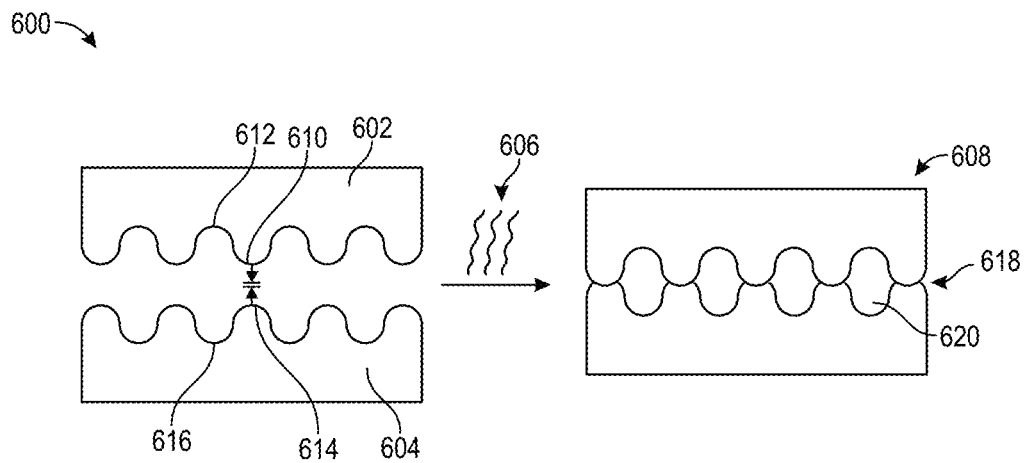

FIG. 3A includes a chart depicting the emissivity of silicon nitride ($Si_3N_4$) following treatment;

FIG. 3B includes a chart depicting the emissivity of silicon carbide (SIC) following treatment;

FIG. 3C includes a chart depicting the emissivity of alumina ($Al_2O_3$) following treatment;

FIG. 4 is an exemplary flowchart depicting a method of treating the surface of a substrate;

FIG. 5A illustrates exemplary overhead views of ultrashort pulse laser-patterned surfaces of silicon carbide (SIC) after a post-process heat treatment;

FIG. 5B illustrates exemplary cross-sectional views ultrashort pulse laser-patterned surfaces of silicon carbide (SiC) after a post-process heat treatment;

FIG. 6A illustrates an exemplary joining process for some embodiments; and

Figure 6B:
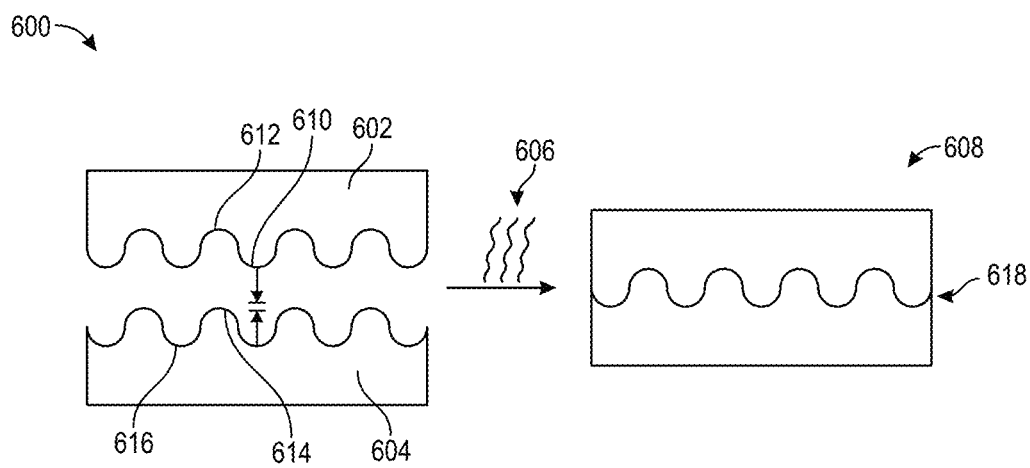

FIG. 6B illustrates an exemplary joining process for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claims. Terms should not be interpreted as implying any particular ordering of various steps described unless the order of individual steps is explicitly described.

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments described herein are generally directed to systems and methods for producing laser induced periodic surface structures (LIPSS) on a non-metallic surface, such as a ceramic surface, via an ultrashort pulse variable wavelength laser system. Different ceramics may be utilized for imparting LIPSS having selected characteristics, based on laser parameters such as power, pulse length, pulse count, wavelength, fluence, among other factors or combination of factors. Through such parameter selection, consistent and repeatable LIPSS are produced or otherwise formed on the ceramic surface, providing for enhanced applications of the ceramic material, including heat transfer applications of the ceramic material. Further, as shown below, treatment of the ceramic material provides chemical changes to the surface of the ceramic, providing changes such as the wetting properties and the emissivity of the ceramic material.

Below the discussion of the surface treatment, optional pre-processing, and optional post-processing steps are discussed. Pre-processing and/or post-processing may provide further changes to the surface of the ceramic. In some embodiments, the systems and methods for treating ceramic surfaces described herein may be utilized as a pre-treatment for joining materials via diffusion bonding, welding, adhesion, or other established joining techniques.

Surface Treatment

Figure 1:
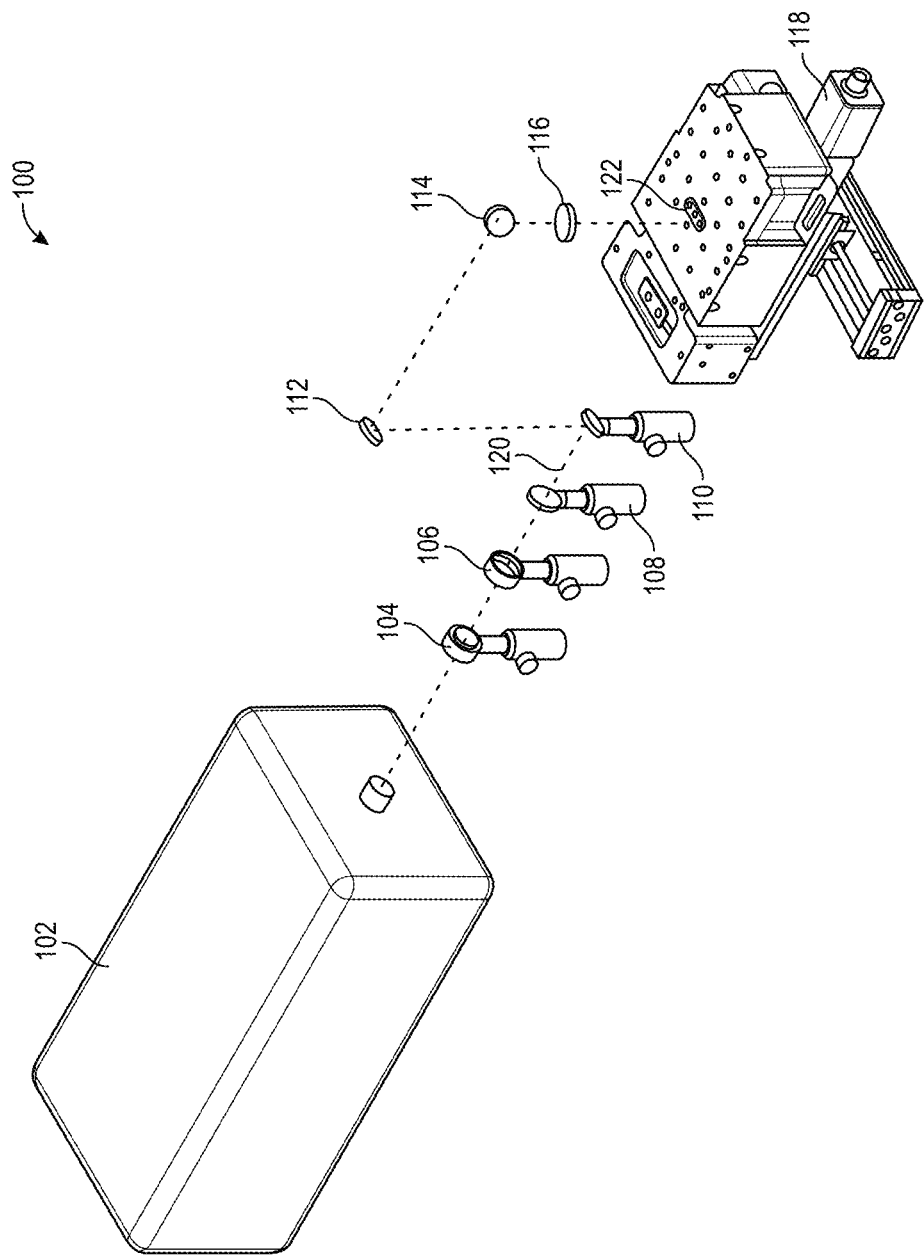
FIG. 1 illustrates an exemplary ultrashort pulse laser-patterning system for some embodiments.

FIG. 1 illustrates a laser system 100, such as an ultrashort pulse (e.g., femtosecond, nanosecond pulse, or picosecond pulse) variable wavelength laser system, configured to perform laser surface modification on a substrate. In some embodiments, an ultrashort pulse, single-pulse laser system or an ultrashort pulse, dual-pulse laser system may be used. Features and structures illustrated include a light emitter 102, shutter 104, half-wave plate 106, polarizer 108, first mirror 110, second mirror 112, third mirror 114, lens 116, and translation stage 118. Embodiments of the present disclosure may incorporate any or all of the features and structures illustrated and may include additional features or structures not illustrated in FIG. 1. In some embodiments, laser system 100 comprises an ultrashort pulse (e.g., femtosecond to picosecond range) variable wavelength laser. Use of an ultrashort pulse variable wavelength pulse laser reduces microcracks and crystalline changes and works with thin films. An ultrashort (e.g., less than 15 femtoseconds (fs) or 10-15 fs) pulse is shorter than the time witnessed in electronic vibrations and can therefore be defined as a non-thermal or room temperature processing method.

In FIG. 1, a beam of light is generated at light emitter 102 using an emitter, such as an ultrashort (e.g., femtosecond, nanosecond, or picosecond) pulsed variable wavelength laser emitter. Light emitter 102 may be coupled to a computer (not shown) and/or a power source, such as a battery or wall outlet. In some embodiments, shutter 104 may fluctuate the timing of light pulses from light emitter 102. For example, shutter 104 may be configured to open and close within the femtosecond to nanosecond range or within the femtosecond to picosecond range. The light is incident into a single mode fiber using half-wave plate 106 and polarizer 108. The generated beam from the single mode fiber constitutes a source beam 120. The source beam 120, in some embodiments, may be reflected using one or more of first mirror 110, second mirror 112, or third mirror 114. The one or more mirrors may be used to redirect the source beam 120, such that source beam 120 directly or incidentally lands on translation stage 118. Following redirection by the one or more mirrors, source beam 120 is focused using lens 116, such that the convergence of source beam 120 is near a substrate 122 on translation stage 118. Translation stage 118 allows for movement of substrate 122 along the x-axis, y-axis, and z-axis. In some embodiments, translation stage 118 may be connected to and controlled remotely, such as by a computer.

Movement of substrate 122 may allow laser system 100 to pattern specific features onto substrate 122. Alternatively, or additionally, at least one of light emitter 102, shutter 104, half-wave plate 106, polarizer 108, first mirror 110, second mirror 112, third mirror 114, or lens 116 may be configured to move such that laser system 100 patterns specific features onto substrate 122. For example, movement of light emitter 102, shutter 104, half-wave plate 106, and polarizer 108 may allow laser system 100 to pattern specific features onto substrate 122. In some embodiments, substrate 122 is patterned, in response to laser system 100, with a plurality of LIPSS (hereinafter "surface structures"). In embodiments, the surface structures may be mounds, pyramids, towers, protrusions, channels, troughs, or other-shaped surface structures, and in embodiments, may be a combination of differently shaped surface structures. In some embodiments, the surface structures are micro and/or nano surface structures. As used herein, a microstructure is a surface structure having a height, width, and/or length within a range of 10 nanometers (nm) to 0.1 millimeters (mm), and a nanostructure is a surface structure having a height, width, and/or length less than 100 nm.

Laser system 100 may form the surface structures through the ablation and redeposition of surface material. As described in greater detail below, the surface structure may be laser-patterned to alter the chemical and/or physical properties (e.g., wettability, emissivity, and/or specific surface area) of the substrate 122. For example, the surface structures may be patterned to be hydrophilic such that water is wicked through the area in-between surface structures formed into the surface of the substrate 122. Accordingly, through movement of the substrate 122, pre-designed patterns or pathways may be engraved on the surface of the substrate 122. Further, the surface structures formed on substrate 122 may be controlled or otherwise formed to adjust or otherwise change one or more chemical and/or physical properties of the substrate. For example and as discussed in more detail below, the surface structures of substrate 122 may be controlled to adjust the diffusivity of the substrate 122 to a predetermined and quantifiable value.

In some embodiments, an ultrashort (e.g., femtosecond) laser-patterned surface comprises a plurality of surface structures patterned on the surface of the substrate. The plurality of surface structures patterned onto the surface of the substrate may be controlled with granularity and consistency and may be repeated (i.e., the process for forming the surface structures in the consistent pattern is repeatable). For example, the surface structures may have a desired height and shape to achieve pyramidal-shaped and sized surface structures, with the ultrashort pulse laser-patterned surface comprising a plurality of parallel channels engraved in a direction. In some embodiments, the surface structures may have an average height within a range of 10 micrometers ($\mu m$) to 2,000 $\mu m$, within a range of 10 $\mu m$ to 100 $\mu m$, within a range of 10 $\mu m$ to 20 $\mu m$, within a range of 100 $\mu m$ to 500 $\mu m$, within a range of 500 $\mu m$ to 1,000 $\mu m$, or within a range of 1,000 $\mu m$ to 2,000 $\mu m$.

In some embodiments, the ultrashort pulse laser-patterned surface comprises a plurality of channels (e.g., channels 206 discussed below) patterned on the surface of the substrate. In some embodiments, the channels may be between the plurality of surface structures as described herein. Further, the plurality of channels may be parallel with each channel in the plurality of channels. Alternatively, the plurality of channels may comprise one or more groups of channels engraved in one or more directions. In some embodiments, the channels may have an average width within a range of 1 $\mu m$ to 2,000 $\mu m$, within a range of 1 $\mu m$ to 1,000 $\mu m$, or within a range of 1 $\mu m$ to 500 $\mu m$. The channels may be between about 1 $\mu m$ to about 50 $\mu m$ wide. In some embodiments, parallel channels may be between about 50 $\mu m$ to about 100 $\mu m$ wide. In some embodiments, parallel channels may be between about 100 $\mu m$ to about 500 $\mu m$ wide. In some embodiments, parallel channels may be between about 500 $\mu m$ to about 2 millimeters (mm) wide.

The size and periodicity of the surface structures may be affected by the parameters of laser system 100 as further described below. For example, the period of the ultrashort pulse laser-patterned surface (i.e., the distance between the surface structures) may be increased by increasing the wavelength of the ultrashort pulse laser. Embodiments are contemplated in which at least one of the pulse rate, the fluence, the wavelength, the speed, the power, or the pulse count of the laser may affect one or more of the height, width, diameter, or period of the surface structures.

In some embodiments, the vertical distance between the tallest peak patterned on the surface and the deepest valley patterned on the surface (Rz) may be similarly affected by the parameters of laser system 100. In some embodiments, Rz may be an average measurement of the vertical distance between the tallest peak and the deepest valley of each sampling length within a plurality of sampling lengths (e.g., five sampling lengths). The Rz of the substrate material may be within a range of 5 $\mu m$ to 2,500 $\mu m$, a range of 25 $\mu m$ to 1,000 $\mu m$, or a range of 50 $\mu m$ to 300 $\mu m$. For example, the Rz of a silicon nitride ($Si_3N_4$) substrate may be 286 $\mu m$. In some embodiments, the Rz of the substrate material may be affected by at least one of the pulse rate, the fluence, the wavelength, the speed, the power, or the pulse count of the laser.

In some embodiments, the ultrashort pulse laser surface treatment described herein may adjust or otherwise modify the surface roughness of the substrate material. The average surface roughness (Ra), defined as the average height deviation of a surface from a mean height of the surface within a sampling length, may be less than 1 $\mu m$ or within a range of 1 $\mu m$ to 2,500 $\mu m$, a range of 100 $\mu m$ to 2,000 $\mu m$, or a range of 200 $\mu m$ to 1,100 $\mu m$. For example, the Ra of a $Si_3N_4$ substrate may be 1,095 $\mu m$. In some embodiments, the Ra of the substrate material may be affected by at least one of the pulse rate, the fluence, the wavelength, the speed, the power, or the pulse count of the laser. The Ra of the substrate may be measured using a laser scanning confocal microscope (LSCM) or similar devices capable of visually inspecting the surface of the substrate.

The above-described laser system 100 may be operated in an atmospheric environment. Alternatively, laser system 100 may be operated in a nitrogen rich environment (e.g., a nitriding environment) or an inert environment. For example, laser system 100 may be operated in an environment consisting of any of helium (He), neon (Ne), argon (Ar), krypton (Kr), xenon (Xe), nitrogen ($N_2$), carbon dioxide ($CO_2$), or other inert gases or vapors. In another example, laser system 100 may be operated in an environment consisting of any of ammonia ($NH_3$), $NH_3$ with hydrogen ($H_2$), $N_2$, or other nitrogen rich gases or vapors.

Laser system 100 may be operated in a reactive environment. For example, the environment may contain reactive materials such that one or more reactions occur to substrate 122 when substrate 122 receives the laser surface treatment. Embodiments are contemplated in which the reactive materials may be any state of matter. For example, the reactive materials may be in a gaseous or vapor state of matter proximate substrate 122. In another example, the reactive materials may be in a liquid or solid state of matter and may be applied to substrate 122 prior to receiving the laser surface treatment. Embodiments are contemplated in which laser system 100 comprises a containment vessel (not shown) to control the environment conditions of the laser surface treatment.

Ceramics react differently to laser processing when compared to metals. For example, forming surface structures on metal surfaces requires melting the surface of the metal substrate to form the surface structures. By contrast, the techniques described herein do not require melting the surface of the ceramic surface. Instead, ceramic surfaces may be sintered to form surface structures using the techniques described herein. Additionally, embodiments provide for forming air pockets and/or pores within the ceramic substrate that is not possible with metal and/or polymer substrates. Further, air pockets and/or pores may be formed repeatedly to form desired characteristics. For example, air pockets and/or pores may be repeatedly formed until a desired porosity between 0% and 100% (e.g., 50% porosity) is achieved.

Further, performing the described techniques on ceramics allow for an adjustment of the surface structures of the substrate that is not available in known techniques for forming surface structures on metal substrates. Accordingly, forming surface structures on non-metallic surfaces, such as ceramic surfaces, allows for the adjusting of physical and/or chemical properties of the material for a specific purpose.

For example, the porosity of a ceramic surface may be adjusted to a predetermined value such that a surface area of the ceramic substrate is increased to facilitate a reaction involving the ceramic surface. Further, performing ultrashort pulse laser processing on ceramic materials may enhance ceramic properties, such as wear resistance and resistance to thermal shock.

In some embodiments, subjecting a ceramic material to an ultrashort pulse variable wavelength laser may form oxide and/or non-oxide ceramic materials on the surface of a ceramic substrate. For example, a first portion of the surface of the substrate material may comprise an oxide ceramic and a second portion of the surface of the substrate material may comprise a non-oxide ceramic after receiving an ultrashort pulse variable wavelength laser process. In some embodiments, subjecting a ceramic material to a laser treatment as described herein may form crystalline and/or glassy structures on the surface of the ceramic substrate. For example, subjecting silicon nitride ($Si_3N_4$) to a laser treatment as described herein may form crystalline silica structures on a first portion of the $Si_3N_4$ surface and glassy silica structures on a second portion of the $Si_3N_4$ surface.

In some embodiments, the laser surface modification may be repeated multiple times on the substrate material. For example, a first laser surface modification may be applied to a first portion of the substrate material and a laser surface modification may be applied to a second portion of the substrate material. Applying multiple laser treatments to the substrate material allows for adjustability and customization of the substrate. For example, a first laser surface modification may form surface structures on a first portion of the substrate that increases the reactivity of the first portion, and a second laser surface modification may form surface structures on a second portion of the substrate that facilitates joining the substrate to a second substrate. In another example, a first laser surface modification may form surface structures on a first portion of the substrate such that the first portion is hydrophilic, and a second laser surface modification may form surface structures on a second portion of the substrate such that the second portion is hydrophobic.

Figure 2A:
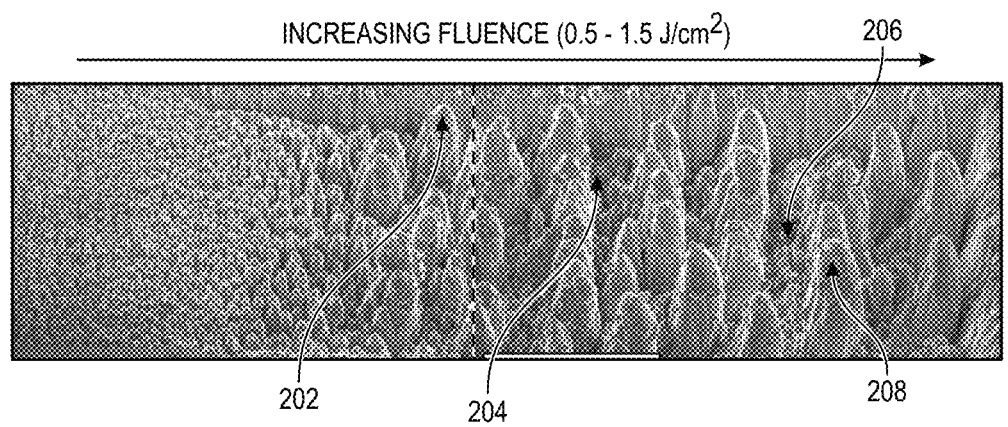
FIG. 2A illustrates an exemplary ultrashort pulse laser-patterned surface of silicon nitride ($Si_3N_4$) for some embodiments.

FIG. 2A illustrates exemplary surface structures made on a substrate of silicon nitride ($Si_3N_4$) using laser system 100 for some embodiments. In particular, FIG. 2A depicts the resulting surface structure that comprises peaks 202, troughs 204, channels 206, and pyramidal protrusions 208. In embodiments, the engraving of the substrate results in physical changes to the surface of the substrate visible through electron scanning or other imaging techniques. For example, a scanning electron microscope (SEM) and laser scanning confocal microscope (LSCM) may be used to visually inspect the surface of the substrate. Specifically, FIG. 2A is a depiction of the surface area of the treated substrate surface of silicon nitride ($Si_3N_4$). In particular, the FIG. 2A depicts a SEM image of a treated silicon nitride ($Si_3N_4$) ceramic surface.

In some embodiments, the substrate patterned with pyramidal protrusions 208 is one type of surface structure that may improve hydrophilic or hydrophobic properties of the substrate treated by ultrashort pulse variable wavelength laser surface processing (e.g., FLSP). For example, larger pyramidal protrusions 208 (i.e., formed by deeper and/or wider troughs) may provide hydrophilic or superhydrophilic properties by allowing the fluid to wick between the pyramidal protrusions 208 and diffuse quickly through the processed surfaces. Such qualities may be advantageous for microfluidic purposes, such as passive mixing of fluids. Surface structures, such as pyramidal protrusions 208, may also be used to separate mixtures of differing compositions. For example, a heterogeneous mixture comprising a hydrophilic and an oil hydrophobic, may be separated by exposing it to a hydrophilic microstructure, such as described above, which would naturally absorb and wick away the hydrophilic while leaving the hydrophobic behind.

As further depicted in FIG. 2A, the size of the surface structures, such as pyramidal protrusions 208, may vary. As described herein, the heights of the surface structures may have significant variance by affecting the parameters of the laser system 100. For example, the pyramidal protrusions 208 as depicted in FIG. 2A are arranged to illustrate the effect of fluence on the size of the resulting pyramidal protrusion 208. Specifically, FIG. 2A depicts the affect that increasing fluence has on engraving surface structures. Starting from the left side of FIG. 2A, pyramidal protrusions 208 are depicted when the fluence is set at 0.5 Joules per square centimeter ($J/cm^2$). Continuing to the right of FIG. 2A, the fluence is increased incrementally until reaching 1.5 $J/cm^2$. As depicted in FIG. 2A, the value of the fluence has a direct correlation to the heights of the surface structures, such as pyramidal protrusions 208. Specifically, increasing the fluence has a net positive effect on the height of the surface structures. For example, portions of the substrate engraved by a laser having a fluence of 1.5 $J/cm^2$ have consistently higher and larger surface structures than portions of the substrate engraved by a laser having a fluence of less than 1.5 $J/cm^2$.

As further depicted in FIG. 2A, in addition to increasing the height of the surface structures, such as pyramidal protrusions 208, the distance or spacing between each surface structure, i.e., the channels 206, is increased. Similar to the formation of surface structures, increasing the fluence has a direct and correlational effect on the size of the channels. For example, portions of the substrate engraved by a laser having a fluence of 1.5 $J/cm^2$ have consistently higher and larger surface structures, such as pyramidal protrusions 208, than portions of the substrate engraved by a laser having a fluence of less than 1.5 $J/cm^2$.

In addition to factors such as fluence having an effect on the size and shape of the LIPSS, the material of the substrate also affects the formation of the surface structures. For example, silicon nitride ($Si_3N_4$) may produce extremely large pyramidal structures, as opposed to metals or even other ceramics. In embodiments in which the substrate 122 is silicon nitride ($Si_3N_4$), the surface structures may comprise an average height of 1,250 µm but can exceed 1,750 µm in height. This is compared to heights of 20-100 µm for other structures made using ultrashort pulse variable wavelength laser processing (e.g., FLSP).

Figure 2B:
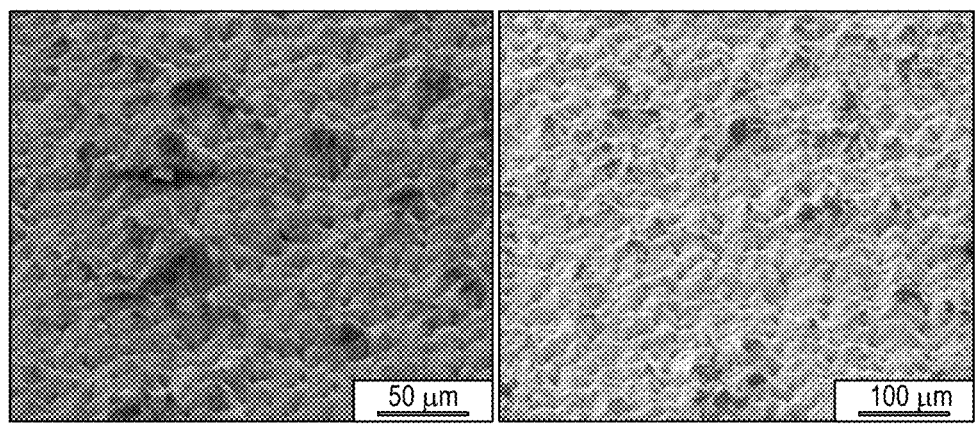
FIG. 2B illustrates an exemplary ultrashort pulse laser-patterned surface of silicon carbide (SiC) for some embodiments.
Figure 2C:
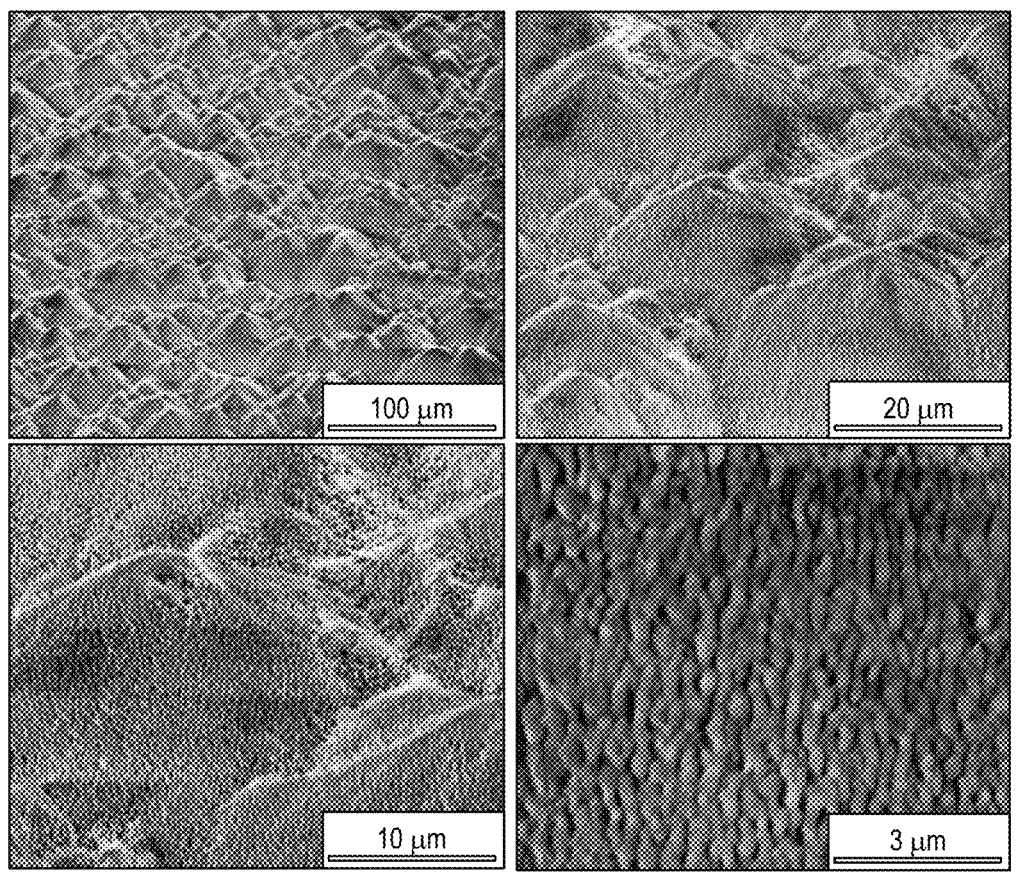
FIG. 2C illustrates an exemplary ultrashort pulse laser-patterned surface of alumina ($Al_2O_3$) for some embodiments.

Different embodiments of substrate 122 may have different surface structures. For example, FIGS. 2B and 2C are SEM images of a treated SiC, and $Al_2O_3$ ceramic surface, respectively. Similar to how ceramics comprise different characteristics that result in significant surface variations as compared to metal substrates, different ceramic substrates may also respond differently to ultrashort pulse variable wavelength laser processing. For example, as depicted in FIG. 2B, when the substrate 122 is silicon carbide (SiC), the resulting surface structures may comprise pit and mound like structures as opposed to the large pyramidal protrusions as found in silicon nitride ($Si_3N_4$) substrates. For example, the pit and mound structures formed on the surface of SiC may comprise a diameter and/or height of approximately 10-20 µm.

By way of another example, and as depicted in FIG. 2C, when substrate 122 is alumina ($Al_2O_3$), the resulting surface structures may also be pyramidic, but with smaller height than the pyramidal protrusions found in silicon nitride ($Si_3N_4$). In embodiments, the surface structures patterned on the surface of $Al_2O_3$ may have an average roughness on the surface of the substrate (Ra) of approximately 3-4 µm and a vertical distance between the tallest peak patterned on the surface and the deepest valley patterned on the surface (Rz) of approximately 23 µm. Therefore, even amongst different ceramic materials, the physical changes resulting from ultrashort pulse variable wavelength laser processing (e.g., FLSP) may vary greatly.

However, it will be appreciated that the material for the substrate may include other ceramic materials. For example, in some embodiments, the substrate may comprise materials with high melting temperatures (e.g., temperatures above 2,000° C.), piezoelectric materials, thermoelectric materials, electro-optic materials, catalyst materials, or materials that absorb electromagnetic radiation. For example, in further embodiments, the substrate may comprise any combination of silicon nitride, silicon carbide, alumina, zirconia, silica, Macor®, boron carbide, boron nitride, graphite, aluminum nitride, or other ceramic materials. In some embodiments, In embodiments, changes to the substrate may not be readily apparent from a visual inspection. However, chemical and/or physical properties of the treated substrate 122 may be measured, including for example, porosity, surface area to area ratio, specific surface area, average surface roughness, diffusivity, reactivity, mechanical strength, wear resistance, wettability, and emissivity such as hemispherical emissivity. Porosity is a measurement of the void spaces in a material. Surface area to area ratio is a unitless measurement of the total area the surface of an object occupies per unit area. Specific surface area is a measurement of the total area the surface of an object occupies per unit mass. Average surface roughness is a measurement of the average height deviation of a surface from a mean height of the surface within a sampling length. Diffusivity is a measurement of the capability of a substance or energy to be diffused through an object (e.g., mass diffusivity or thermal diffusivity). Reactivity is a measurement of the degree to which a substance is reactive. Mechanical strength is a measure of the ability to withstand an applied load without failure (e.g., mechanical strength based on critical flaw theory). Wear resistance is the measure of the ability to withstand damage, abrasion, or deformation. Wettability is the ability of a liquid to spread over a surface and can be measured by the angle at which the liquid-vapor interface meets the solid-liquid interface (known as the contact angle). Hemispherical emissivity is a measurement of how effective a surface is at emitting thermal energy.

In embodiments, the above-described chemical and/or physical properties of the ceramic material may be significantly altered (e.g., adjusted or changed) following treatment by laser system 100. Further, at least one of the above-described chemical and/or physical properties of the substrate 122 may be adjusted (e.g., changed) to a predetermined value. As used herein, a predetermined value of a chemical and/or physical property is a value of the property that can be set by a user and quantified.

For example, the porosity of substrate 122 may be adjusted to a predetermined value within an inclusive range of 0% to 100%, such as a porosity of 50%. The surface area to area ratio may be adjusted to a predetermined value within a range of 1 to 20. The specific surface area of substrate 122 may be adjusted to a predetermined value within a range of 0.1 square meters per gram ($m^2/g$) to 2,000 $m^2/g$ or above a value of 1,000 $m^2/g$. The average surface roughness may be adjusted to a predetermined value of less than 1 µm or within a range of 1 µm to 2,500 µm, a range of 100 µm to 2,000 µm, or a range of 200 µm to 1,100 µm. The diffusivity of substrate 122 may be adjusted to a predetermined value within a range of 0.01 square millimeters per second ($mm^2$/s) to 20 $mm^2$/s. The mechanical strength of substrate 122 may be adjusted to a predetermined value within a range of 100 megapascals (MPa) to 3,000 MPa. The wettability of substrate 122 may be adjusted to a predetermined value such that the contact angle is within a range of 0 degrees to 180 degrees. In some embodiments, a contact angle less than 90 degrees indicates that wetting of the surface is favorable (i.e., hydrophilic) and a contact angle greater than 90 degrees indicates that wetting of the surface is unfavorable (i.e., hydrophobic). The emissivity of substrate 122 may be adjusted to a predetermined value within a range of 0 to 1.

FIGS. 3A-3B depict various graphs corresponding to the emissivity of a treated substrate following ultrashort pulse variable wavelength laser processing (hereinafter "laser processing" for short). FIG. 3A depicts the measured emissivity of silicon nitride ($Si_3N_4$) following ultrashort pulse variable wavelength laser processing. In embodiments, processed silicon nitride ($Si_3N_4$) comprises hemispherical emissivity of approximately 0.9743. In embodiments, unprocessed silicon nitride ($Si_3N_4$) comprises hemispherical emissivity of 0.664. Accordingly, following ultrashort pulse variable wavelength laser processing, silicon nitride ($Si_3N_4$) comprises a near theoretical level of hemispherical emissivity for silicon nitride. This drastic increase in hemispherical emissivity may be particularly useful in heat transfer applications.

FIG. 3B depicts the measured emissivity of silicon carbide (SiC) following ultrashort pulse variable wavelength laser processing. In embodiments, the processed silicon carbide (SiC) comprises a hemispherical emissivity of approximately 0.941. Accordingly, following ultrashort pulse variable wavelength laser processing, silicon carbide (SiC) comprises a near theoretical level of hemispherical emissivity for silicon carbide. In embodiments, unprocessed silicon carbide (SiC) comprises a hemispherical emissivity of approximately 0.513. In further embodiments, the surface of treated silicon carbide (SiC) may comprise a loose layer of ultrashort pulse variable wavelength laser processing generated nanoparticles. As described below, the loose layer of nanoparticles generated during ultrashort pulse variable wavelength laser processing may be removed from the surface through a post-process comprising an ultrasonic bath. In embodiments, the loose layer of nanoparticles affects the hemispherical emissivity of the silicon carbide (SiC). For example, following removal of the loose layer of generated nanoparticles by ultrasonic bath in distilled water, silicon carbide (SiC) comprises a hemispherical emissivity of approximately 0.806.

FIG. 3C depicts the measured emissivity of alumina ($Al_2O_3$) following laser processing. In embodiments, the processed alumina ($Al_2O_3$) comprises a hemispherical emissivity of approximately 0.861. Accordingly, following laser processing, alumina ($Al_2O_3$) comprises a near theoretical level of hemispherical emissivity for alumina. In embodiments, unprocessed alumina ($Al_2O_3$) comprises a hemispherical emissivity of approximately 0.664. Similar to silicon carbide (SIC), alumina ($Al_2O_3$) may also comprise a layer of laser processing-generated nanoparticles. In embodiments and unlike silicon carbide (SiC), the removal of the laser processing-generated nanoparticles does not affect the hemispherical emissivity of alumina ($Al_2O_3$). For example, following an ultrasonic bath in distilled water, alumina ($Al_2O_3$) still comprises a hemispherical emissivity of approximately 0.861.

FIG. 4 depicts a method 400 for producing LIPSS on a surface of a substrate material, such as substrate 122 as described above with respect to FIG. 1. In embodiments, step 402 is the selection and pre-treatment of a substrate for engraving LIPSS via laser processing. As described above, different substrates react differently to ultrashort pulse variable wavelength laser processing. As further demonstrated above, even different ceramics can react differently when exposed to an ultrashort pulse laser system (e.g., a femtosecond laser system, a nanosecond laser system, or a picosecond laser system). Accordingly, step 402 may include selecting a substrate based on the intended application of the substrate following treatment. By way of non-limiting example, when the intended application requires a substrate having a large emissivity, then silicon carbide (SiC) may be selected. In further embodiments, when the intended application requires a substrate having large pyramidal structures, then silicon nitride ($Si_3N_4$) may be selected. However, any substrate may be selected for the formation of LIPSS.

Additionally, during step 402 the selected substrate may undergo an optional pre-treatment, such as any pre-treatment discussed below. FIG. 4 illustrates the optionality via the broken arrow connecting step 402 to 404. In some embodiments, the pre-treated substrate results in physical or chemical changes to the surface of the substrate that affect the ultrashort pulse laser processing and/or the formation of LIPSS. In embodiments, desired surface structures, surface characteristics, or other characteristics of the substrate may be affected through a pre-treatment processing of the substrate. In some embodiments, the substrate may be enhanced, reduced, or otherwise altered through such pre-treatment processing. In even further embodiments, the pre-treatment of the substrate may include a combination of two or more of the treatment techniques discussed below. As noted, in some embodiments, the pre-treatment may be optional such that method 400 does not include pre-treatment of the laser treated substrate.

At step 404, ultrashort pulse laser processing of the substrate is performed. The ultrashort pulse laser processing may be performed using the laser system 100 above to cause a laser on the substrate to form surface structures on the surface of the substrate. The surface structures may be formed through the ablation and redeposition of the surface material of the substrate.

In embodiments, the ultrashort pulse laser processing is customizable or otherwise adjustable, with varying parameters being variable to impart a desired effect on the LIPSS. For example, in embodiments, the pulse rate of the laser may be modified. In further embodiments, the fluence of the laser may be modified. For example, the fluence of the laser may be within a range of 0.1 Joules per square centimeter ($J/cm^2$) to 5 $J/cm^2$ or within a range of 0.5 $J/cm^2$ to 45 $J/cm^2$. Further, the fluence of the laser may be selected to form surface structures of a predetermined height. For example, the fluence of the laser may be a value of 1.5 $J/cm^2$ such that the average height of the LIPSS is within a range of 1,000 micrometers (µm) to 1,800 µm.

In some embodiments, the wavelength of the laser may be modified. For example, the wavelength of the laser may vary within a range of 300 nanometers (nm) to 1,200 nm. For example, the wavelength of the laser may be any of 355 nm, 532 nm, 800 nm, or 1064 nm. Further, modifying the wavelength of the laser may adjust the period of the surface structures (i.e., the distance between the surface structures) formed by the ultrashort pulse laser processing. For example, increasing the wavelength of the laser may increase the distance between the formed surface structures. Further, for example, for wavelengths of 355 nm, 532 nm, and 1064 nm, the distance between the formed surface structures may be 300 nm, 360 nm, and 580 nm respectively.

In some embodiments, the speed of the laser may be modified. For example, the speed of the laser may be within a range of 0.25 millimeters per second (mm/s) to 10 mm/s. In some embodiments, the power of the laser may be modified. For example, the power of the laser may be within a range of 5 millijoules per pulse (mJ/pulse) to 500 mJ/pulse. In yet further embodiments, the pulse count of the laser may be modified. For example, the pulse count may be less than 1,000 pulses, within a range of 500 pulses to 10,000 pulses, within a range of 10,000 pulses to 50,000 pulses, or greater than 50,000 pulses. Further, a combination of the parameters may be modified. For example, in some embodiments, a combination of a low laser fluence and a high pulse count imparts desirable surface structures on the surface of the substrate. However, other combinations of parameters may be utilized to achieve described surface structures characteristics or other desirable effects on the substrate.

For example, the parameters chosen during step 404 may be dependent on the material selected for treatment. Table 1 depicts exemplary parameters that the laser system 100 can be programmed with or set up to run with particular substrate materials.

TABLE 1

| | | Laser Parameter | | | | | | |
|---|---|---|---|---|---|---|---|---|
| | Material | Wavelength (nm) | Repetition Rate (kHz) | Speed (mm/s) | Power (mJ/pulse) | Pulse Length (fs) | Pulse Count | Fluence ($J/cm^2$) |
| Metal | Aluminum (2024 T3) | 800 | 1 | 0.5 | 450 | 50 | NR | 0.513 |
| | Aluminum (6061) | 800 | 1 | 4.4 | NR | 35 | 1000 | 1.5/4.5 |
| | Nickel | 800 | 1 | 2 | NR | 50 | 940 | 0.15 |
| | | 800 | 1 | 0.5 | NR | 50 | 16820 | 0.15 |
| Ceramic | Silicon Nitride ($Si_3N_4$) | 800 | 1 | NR | 6 | 35 | 27900, 50200, 73900 | 0.5-1.5 |
| | Silicon Carbide (SiC)*, pits | 800 | 1 | NR | 6 | 35 | 11700 | 0.79 |

TABLE 1-continued

| | Laser Parameter | | | | | | |
|---|---|---|---|---|---|---|---|
| Material | Wavelength (nm) | Repetition Rate (kHz) | Speed (mm/s) | Power (mJ/pulse) | Pulse Length (fs) | Pulse Count | Fluence (J/cm$^2$) |
| Silicon Carbide (SiC)*, mound | 800 | 1 | NR | 6 | 35 | 7000 14200 16000 | 0.25-0.6 |
| Alumina (Al$_2$O$_3$), pyramids | 800 | 1 | NR | 10 | 35 | 13000 | 1.1 |
| Alumina (Al$_2$O$_3$), nanoparticle | 800 | 1 | NR | 10 | 35 | 3000 | 1.2 |

In some embodiments, step 404 may be performed in an atmospheric environment. Alternatively, step 404 may be performed in a nitrogen rich environment (e.g., a nitriding environment) or an inert environment. For example, the laser surface treatment may be performed in an environment consisting of any of helium (He), neon (Ne), argon (Ar), krypton (Kr), xenon (Xe), nitrogen (N$_2$), carbon dioxide (CO$_2$), or other inert gases or vapors. In another example, step 404 may be performed in an environment consisting of any of ammonia (NH$_3$), NH$_3$ with hydrogen (H$_2$), N$_2$, or other nitrogen rich gases or vapors.

Step 404 may be performed in a reactive environment. For example, the environment may contain reactive materials such that one or more reactions occur to the substrate material when receiving the laser surface treatment. Embodiments are contemplated in which the reactive materials may be any state of matter. For example, the reactive materials may be in a gaseous or vapor state of matter proximate the substrate material. In another example, the reactive materials may be in a liquid or solid state of matter and may be applied to the substrate material during the pre-treatment of the substrate material.

In some embodiments, step 404 may be repeated multiple times on the substrate material. For example, a first ultrashort pulse laser processing comprising a first set of parameters may be applied to a first portion of the substrate material, and a second ultrashort pulse laser processing comprising a second set of parameters may be applied to a second portion of the substrate material. Applying multiple laser treatments to the substrate surface allows for adjustability and customization of the substrate. For example, a first laser process may form a first set of surface structures on a first portion of the substrate that increases the reactivity of the first portion and a second laser process may form a second set of surface structures on a second portion of the substrate that facilitates joining the substrate to a second substrate.

At step 406, optional post-treatment of the laser treated substrate occurs following the laser treatment. FIG. 4 illustrates the optionality via the broken arrow connecting step 404 to 406. The post-treatment of the laser treated substrate may include any of the post-treatments discussed below. Similar to the pre-treatment of the substrate, the post-treatment of the substrate may involve a variety of techniques, depending on the intended application of the substrate or the effect on the surface structures. In some embodiments, the post-treated substrate results in physical or chemical changes to the surface structures on the surface of the substrate. In even further embodiments, the post-treatment of the substrate may include a combination of two or more of the treatment techniques discussed below. As noted, in some embodiments, step 406 may be optional such that method 400 does not include post-treatment of the laser treated substrate.

Pre-Processing

As discussed above with respect to step 402, the substrate may undergo optional pre-treatment prior to the surface treatment of the substrate. In some embodiments, pre-treatment comprises any of a heat treatment, an acid and/or chemical wash, an etching process, a roughening of the surface, degreasing, cleaning, polishing. In some embodiments, desired surface structures, surface characteristics, or other characteristics of the substrate may be affected through a pre-treatment processing of the substrate. For example, etching and/or roughening the surface of a substrate may affect the period of the surface structures (i.e., the distance between the surface structures) formed via the ultrashort pulse laser processing described above. For example, roughening a substrate surface may decrease the distance between the surface structures formed on the roughened substrate surface when compared to the surface structures formed on a smooth substrate surface. In embodiments, the substrate may be enhanced, reduced, or otherwise altered through such pre-treatment processing.

The method of pre-treatment processing may be dependent on the intended application of the treated substrate. Non-limiting examples of such applications or use cases of a treated substrate include, but are not limited to: thermal applications, including thermal management systems; chemical applications, including increasing catalytic behavior, decreasing corrosion by reduction in diffusion, or increasing or decreasing reactivity; mechanical applications, including increasing or decreasing mechanical strength based on critical flaw theory; tribological applications, including increasing wear resistant; and optical applications, including altering light-matter interactions.

Accordingly, the pre-treatment processing of the substrate may be dependent on the intended application. For example, in some embodiments, the pre-treatment processing of the substrate may include heating the substrate to a desired temperature. In further embodiments, the pre-treatment processing of the substrate may include an acid wash or chemical etching of the surface of the substrate. In even further embodiments, the pre-treatment processing of the substrate may include applying an ultrasonic frequency to the surface of the substrate. In even further embodiments, the surface of the substrate may be polished to obfuscate the surface of the substrate.

In some embodiments, the pre-treatment processing may include applying one or more reactants to the substrate such that one or more reactions occur to the substrate material during the above-described laser surface treatment. For example, the pre-treatment processing may include applying a liquid or a solid to the surface of the substrate material to facilitate surface reactions during the laser surface treatment. Other pre-treatment techniques may be utilized to treat the substrate prior to ultrashort pulse laser processing. Embodiments are contemplated in which the pre-treatment is performed in any of an atmospheric environment, an inert environment, or a reactive environment similar to those described with respect to the laser surface treatment.

Post-Processing

As discussed above with respect to step 406, optional post-treatment of the laser treated substrate may occur following the laser treatment. Similar to the above-described pre-treatment of the substrate, the post-treatment of the substrate may involve a variety of techniques, depending on the intended application of the substrate or the effect on the surface structures. For example, in some embodiments, post-treatment of the substrate may include heat treatment of the treated substrate, such as sintering. In some embodiments, post-treatment may include any of a heat treatment, a cleaning treatment, or a surface coating. In some embodiments, post-treatment of the treated substrate results in physical or chemical changes to the surface structures of the substrate. For example, heat treatment of the surface may aid in stabilizing a nanoparticle layer on the substrate's surface.

In further embodiments, the post-treatment of the substrate may include an ultrasonic bath in distilled water. An ultrasonic bath in distilled water may be particularly beneficial for removing loose nanoparticles formed during treatment of the substrate. The removal of loose nanoparticles may affect the emissivity, the wettability, and/or the transmissibility of the substrate. In further embodiments, an ultrasonic bath in distilled water may further break, wear down, or otherwise reduce the size of the surface structures on the surface of the ceramic. For example, as described above, the surface structures formed on the substrate material may comprise heights of 1750 micrometers. Following an ultrasonic bath in distilled water, the size of the surface structures may be reduced by approximately 10% to approximately 50% in size. For example, the average height of the surface structures may be reduced by a range of 10% to 50% of the average height.

In some embodiments, the surface of substrate 122 may be coated using a material, such as a reactant. In embodiments in which the surface of substrate 122 are coated with a reactant coating, substrate 122 may be utilized to perform one or more reactions. For example, a substrate 122 with a large surface area may be covered with a reactant to facilitate reactions by utilizing the large surface area. Embodiments are contemplated in which substrate 122 may be covered with a catalyst and used to facilitate reactions. In some embodiments, substrate 122 may be coated with a coating material to lock in the surface structure of the substrate 122.

In even further embodiments, the post-treatment of the substrate may include a combination of two or more treatment techniques. For example, in embodiments, the treated substrate may undergo both heat treatment and an ultrasonic bath. Embodiments are contemplated in which any of the post-treatments described herein may be performed in any of an atmospheric environment, an inert environment, or a reactive environment similar to those described with respect to the laser surface treatment.

Turning now to FIGS. 5A-5B, post-processing may include annealing or otherwise heating the surface of the substrate after receiving the surface treatment. FIG. 5A illustrates overhead views 500, 502, 504, 506 of surfaces of silicon carbide (SiC) after receiving a surface treatment as discussed herein and a post-process heat treatment. The surfaces illustrated in FIGS. 5A-5B depict SiC surfaces after receiving the ultrashort pulse laser surface treatment as described above without additional processing (i.e., without pre-processing and additional post-processing). Overhead view 500 illustrates a SiC surface after annealing the treated surface at 800° C., overhead view 502 illustrates a SiC surface after annealing the treated surface at 1,000° C., overhead view 504 illustrates a SiC surface after annealing the treated surface at 1,200° C., and overhead view 506 illustrates a SiC surface after annealing the treated surface at 1,400° C.

The above-described overhead views 500, 502, 504, 506 illustrate the effect of heating a laser-treated surface of a substrate (e.g., substrate 122) at different temperatures for the same length of time. The overhead views 500, 502, 504, 506 depict the surface of a substrate comprising surface structures, such as channels 508 and protrusions 510. In some embodiments, heating the laser-treated surface of the substrate may densify one or more protrusions 510 and/or the surface of the substrate. In other words, heating the laser-treated surface of the substrate decreases the porosity of one or more protrusions 510 and/or the surface of the substrate.

FIG. 5B illustrates cross-sectional views of surfaces of silicon carbide (SIC) after receiving a surface treatment as discussed herein and a post-process heat treatment. Cross-sectional view 512 illustrates a cross-section of a SiC surface after annealing the treated surface at 800° C., cross-sectional view 514 illustrates a cross-section of a SiC surface after annealing the treated surface at 1,000° C., cross-sectional view 516 illustrates a cross-section of a SiC surface after annealing the treated surface at 1,200° C., and cross-sectional view 518 illustrates a cross-section of a SiC surface after annealing the treated surface at 1,400° C.

The above-described cross-sectional views 512, 514, 516, 518 illustrate the effect of heating a laser-treated surface of a substrate at different temperatures for 30 minutes. The cross-sectional views 512, 514, 516, 518 depict a surface structure, such as a protrusion 510, comprising an original material region 520 (i.e., a portion of the substrate material not ablated by the laser surface treatment) and a porous region 522 formed from ablated and redeposited material during the laser surface treatment as described above. For example, the protrusion 510 is formed by redepositing a portion of the ablated substrate material onto the original material region 520 such that the porous region 522 is formed on the original material region 520. As the temperature of the heat treatment is increased, protrusion 510 and/or the surface of the substrate becomes less porous. In other words, as the temperature of the heat treatment is increased, the porous region 522 may decrease in porosity and/or become smaller. Similarly, as the temperature of the heat treatment is increased, protrusion 510 and/or the surface of the substrate becomes denser.

Performing a heat treatment to the surface of a substrate may allow for control over the microstructure of the surface of the substrate. As discussed above, the porosity of the surface of the substrate may be controlled by controlling the temperature of the heat treatment. For example, the porosity of the surface may be decreased by performing a higher temperature (e.g. 1,400° C., or higher than 1,000° C.) heat treatment. Embodiments are contemplated in which the heat treatment may heat one or more LIPSS of the substrate material to a temperature between 600° C. to 2,000° C. (including subranges, such as 800° C. to 1,600° C.). In some embodiments, the time of the heat treatment is also controlled. For example, the heat treatment may be within a range of 5 minutes to 3 hours, within a range of 10 minutes to 1 hour, or within a range of 15 minutes to 45 minutes. In some embodiments, the heat treatment may affect other chemical and/or physical properties of the surface of the substrate, such as wettability, surface area, and/or emissivity.

Other techniques are known that achieve a porous structure of ceramics. However, such known techniques create bulk, uniform porosity ceramics and cannot control the microstructure of the ceramic surface. By contrast, the techniques described herein allow for a controlled microstructure of the ceramic substrate. By controlling the microstructure of the ceramic substrate (e.g., selectively forming surface structures on the ceramic substrate), the porosity, wettability, diffusivity, and/or emissivity of the ceramic surface, as well as other chemical and/or physical properties of the ceramic surface, may be controlled. Further, the techniques described herein allow for creation of a bulk solid ceramic part comprising a porous portion on the surface of the ceramic part.

Joining Method

FIGS. 6A-6B depict a joining method 600 for joining or otherwise adhering together a first substrate 602 and a second substrate 604 using heat 606 to form a joined part 608. In some embodiments, heat 606 may be from a heat treatment process such as sintering. The surface of the first substrate 602 may comprise surface structures, such as protrusions 610 and channels 612, and the surface of the second substrate 604 may comprise surface structures, such as protrusions 614 and channels 616. As depicted in FIG. 6A, protrusions 610 of the first substrate 602 and protrusions 614 of the second substrate 604 may be aligned (e.g., protrusions 610 are proximate protrusions 614) such that the two or more substrates 602, 604 are joined together when heated. Protrusions 610 of first substrate 602 may sinter with protrusions 614 of second substrate 604, thereby joining together two or more substrates 602, 604 at one or more bonding areas 618 to form joined part 608.

Joining two or more substrates (e.g., substrates 122, 602, and/or 604) using heat 606 may form hourglass-like shapes at one or more bonding areas 618 and microchannels 620 within joined part 608. Accordingly, joined part 608 may comprise a porous junction of two or more substrates 602, 604 and allow a fluid to flow through joined part 608 via the porous junction (e.g., microchannels 620). Although, FIG. 6A depicts microchannels 620 being parallel, it should be understood that microchannels 620 may extend through joined part 608 in any direction and may intersect with one or more microchannels 620 in the volume of joined part 608.

Alternatively, joining two or more substrates (e.g., substrates 122, 602, and/or 604) together may from a joined part 608 without microchannels 620. Further, joined part 608 may be a solid part such that fluids cannot flow through joined part 608. Accordingly, joined part 608 may comprise a solid junction of two or more substrates 602, 604 such that joined part 608 does not comprise pores (e.g., microchannels 620). Embodiments are contemplated in which a first portion of joined part 608 may be completely solid and a second portion of joined part 608 comprises microchannels 620. Further, microchannels may be predetermined to allow flow through one or more portions of joined part 608 while restricting flow through other portions of joined part 608.

As depicted in FIG. 6B, protrusions 610 of first substrate 602 and channels 616 of second substrate 604 may be aligned such that the protrusions 610 of first substrate 602 may at least partially be received within the channels 616 of second substrate 604. In some embodiments, introducing heat 606 may adhere the first substrate 602 and the second substrate 604 together to form part 608. Further, the first substrate 602 and the second substrate 604 may be joined via sintering. Protrusions 610 of first substrate 602 may sinter with at least a portion of channels 616 of second substrate 604, thereby joining together two or more substrates 602, 604 at one or more bonding areas 618 to form joined part 608.

In some embodiments, joining two or more substrates 602, 604 may create channels on the mesoscale or macroscale. As used herein, a mesoscale structure (e.g., a mesoscale channel or a mesoscale protrusion) is a surface structure having a height, width, and/or length within a range of 50 micrometers (µm) to 5 millimeters (mm), and a macroscale structure is a surface structure having a height, width, and/or length greater than 0.5 mm For example, joined part 608 may have a macroscale channel with a width of 1 mm such that the macroscale channel is visible to the human eye. In some embodiments, the channels within joined part 608 (e.g., microchannels 620, mesoscale channels, and/or macroscale channels) may comprise an active surface configured to react with one or more reactants that come into contact with the active surface. For example, joined part may comprise mesoscale channels with an active surface configured to facilitate reactions with a fluid reactant flowing through the mesoscale channels.

In some embodiments, joined part 608 may comprise chambers and/or passages (e.g., microchannels 620) comprising at least a first laser-treated surface and a second laser-treated surface that are not in contact with each other. In such embodiments, joined part 608 may be formed by joining two or more substrates 602, 604 at one or more edges having received the ultrashort pulse laser surface treatment as described herein such that the first laser-treated surface and the second laser-treated surface are a predetermined distance apart (e.g., 5 µm to 100 µm apart). For example, one or more surfaces proximate an edge of a first substrate 602 and one or more surfaces proximate an edge of a second substrate 604 may receive a laser surface treatment to facilitate the joining of first substrate 602 and second substrate 604 to form a joined part 608 comprising one or more passages, wherein each passage comprises a first laser-treated surface and a second laser-treated surface that is not in contact with the first laser-treated surface. Embodiments are contemplated in which the chambers and/or passages comprises a first plurality of laser-treated surfaces from the first substrate 602 and a second plurality of laser-treated surfaces from the second substrate 604 that are not joined or in contact with each other, such that there is a distance between the first plurality of laser-treated surfaces and the second plurality of laser-treated surfaces.

Some embodiments are contemplated in which the methods and systems for treating ceramic surfaces described herein may be utilized as a pre-treatment for joining two or more ceramic surfaces as depicted in FIGS. 6A-6B. In some embodiments, the two or more ceramic surfaces may comprise one or more ceramic materials. For example, a first ceramic surface comprising a first ceramic material may be joined to a second ceramic surface comprising a second ceramic surface. In some embodiments, joining method described herein may be utilized to join similar or dissimilar ceramic materials.

In some embodiments, the combination of the ultrashort pulse laser processing and the joining method 600 as described above may allow for an adjustable microstructure of a ceramic material. Accordingly, forming surface structures on one or more surfaces of two or more ceramic substrates and joining the two or more ceramic substrates via the one or more surfaces allows for the adjusting of chemical and/or physical properties of ceramic substrate 122 and/or the joined part 608 for a specific purpose. For example, joined part 608 may be formed to have a porous joint allowing the flow of fluid through joined part 608. In some embodiments, at least one chemical and/or physical property is adjusted to a predetermined value, wherein the predetermined value is a predetermined value of at least one of an adjusted chemical property or an adjusted physical property, Other techniques are known that achieve a porous structure of ceramic materials. However, such known techniques create bulk uniform porosity ceramics or use require machining to produce a channel and cannot control the microstructure of the ceramic material. By contrast, the techniques described herein allow for a controlled microstructure of the ceramic material. By controlling the microstructure of the ceramic material, the porosity, wettability, diffusivity, reactivity, and/or emissivity of the ceramic material, as well as other chemical and/or physical properties of the ceramic material, may be controlled.

Further, the joining of ceramics after densification is not easily achieved through known techniques. By contrast, the techniques described herein provides a method for joining of two or more ceramic materials even after densification of the ceramic materials. The joining method described herein utilizes an increased surface area to facilitate the joining of ceramic materials. Further, the joining method described herein utilizes a heat treatment to facilitate the joining of ceramic materials. The techniques described herein allow for creation of a bulk solid ceramic part comprising a porous portion at the joint of two or more ceramic materials.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

The invention claimed is:

1. A method for producing laser induced periodic surface structures on a substrate material, the method comprising:
   performing a pre-treatment of a surface of the substrate material,
   wherein the substrate material is a non-metallic material;
   forming a plurality of surface structures on the surface of the substrate material,
   wherein forming is performed by an ultrashort pulse laser system,
   wherein the plurality of surface structures comprises periodically consistent micro or nano structures formed in response to the ultrashort pulse laser system,
   wherein forming the plurality of surface structures adjusts at least one of a chemical property or a physical property of the substrate material to a predetermined value; and
   performing a post-treatment of the surface of the substrate material.

2. The method of claim 1, wherein the post-treatment comprises at least one of an ultrasonic bath in distilled water or a surface coating.

3. The method of claim 1, wherein at least one of the pre-treatment or the post-treatment facilitates adjusting the at least one of the chemical property or the physical property of the substrate material to the predetermined value.

4. The method of claim 1, further comprising performing a heat treatment to one or more surface structures from the plurality of surface structures, wherein performing the heat treatment includes sintering the one or more surface structures to control a porosity of the one or more surface structures.

5. The method of claim 1, wherein the substrate material is a ceramic material selected from the group consisting of silicon nitride, silicon carbide, alumina, aluminum nitride, zirconia, silica, boron carbide, boron nitride, and graphite.

6. The method of claim 1, wherein the pre-treatment comprises at least one of a heat treatment, a chemical wash, or an etching process.

7. A method for producing laser induced periodic surface structures on a substrate material, the method comprising:
   forming a plurality of surface structures on a surface of the substrate material,
   wherein the substrate material is a non-metallic material,
   wherein forming is performed by an ultrashort pulse laser system,
   wherein the plurality of surface structures comprises periodically consistent micro or nano structures formed in response to the ultrashort pulse laser system; and
   performing a post-treatment of the surface of the substrate material,
   wherein forming the plurality of surface structures and performing the post-treatment adjust at least one of a chemical property or a physical property of the substrate material to a predetermined value.

8. The method of claim 7,
   wherein the at least one of the chemical property or the physical property includes at least one of porosity, specific surface area, diffusivity, reactivity, mechanical strength, wear resistance, wettability, or emissivity,
   wherein the predetermined value is of at least one of an adjusted chemical property or an adjusted physical property.

9. The method of claim 7, wherein the post-treatment comprises at least one of an ultrasonic bath in distilled water or a surface coating.

10. The method of claim 7, wherein the substrate material is a ceramic material selected from the group consisting of silicon nitride, silicon carbide, alumina, aluminum nitride, zirconia, silica, boron carbide, boron nitride, and graphite.

11. The method of claim 7, wherein the plurality of surface structures comprises a plurality of protrusions with an average height within a range of 10 micrometers to 2,000 micrometers and a plurality of channels with an average width within a range of 1 micrometer to 2,000 micrometers.

12. The method of claim 11, wherein the post-treatment comprises an ultrasonic bath in distilled water such that the average height of the plurality of protrusions is reduced by a range of 10% to 50% of the average height.

13. A method for joining a plurality of ceramic surfaces, the method comprising:
   forming a first plurality of surface structures on a first surface of a first ceramic material;
   forming a second plurality of surface structures on a second surface of a second ceramic material,
   wherein the plurality of ceramic surfaces comprises at least the first ceramic material and the second ceramic material, wherein forming is performed by an ultrashort pulse laser system, wherein the first plurality of surface structures and the second plurality of surface structures comprise periodically consistent micro or nano structures formed in response to the ultrashort pulse laser system;

positioning one or more surfaces structures of the first plurality of surface structures proximate one or more surface structures of the second plurality of surface structures; and heating the first ceramic material and the second ceramic material such that the one or more surfaces structures of the first plurality of surface structures join to the one or more surface structures of the second plurality of surface structures at one or more bonding areas.

14. The method of claim 13, further comprising:

performing one or more pre-treatments on at least one of the first ceramic material or the second ceramic material.

15. The method of claim 13, wherein joining the first ceramic material to the second ceramic material forms a joined part, wherein forming the first plurality of surface structures, forming the second plurality of surface structures, and joining the first ceramic material to the second ceramic material adjust at least one of a chemical property or a physical property of the joined part to a predetermined value.

16. The method of claim 15, wherein the at least one of the chemical property or the physical property includes at least one of porosity, specific surface area, diffusivity, reactivity, mechanical strength, wear resistance, wettability, or emissivity, wherein the predetermined value is of at least one of an adjusted chemical property or an adjusted physical property.

17. The method of claim 16, wherein a joint of the first ceramic material and the second ceramic material comprises one or more porous channels.

18. The method of claim 13, wherein the first ceramic material and the second ceramic material is each selected from the group consisting of silicon nitride, silicon carbide, alumina, aluminum nitride, zirconia, silica, boron carbide, boron nitride, and graphite.

19. The method of claim 1, wherein the pre-treatment comprises applying one or more reactants to the surface of the substrate material, wherein the forming the plurality of surface structures on the surface of the substrate material causes one or more reactions of the substrate material and the one or more reactants.

* * * * *